United States Patent
Ma et al.

(10) Patent No.: US 12,460,241 B2
(45) Date of Patent: Nov. 4, 2025

(54) BIOSENSOR

(71) Applicant: DONGWOO FINE-CHEM CO., LTD., Jeollabuk-do (KR)

(72) Inventors: Dong Hee Ma, Gyeonggi-do (KR); Dong Yeop Lee, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 418 days.

(21) Appl. No.: 17/718,626

(22) Filed: Apr. 12, 2022

(65) Prior Publication Data

US 2022/0243245 A1 Aug. 4, 2022

Related U.S. Application Data

(63) Continuation of application No. PCT/KR2020/016362, filed on Nov. 19, 2020.

(51) Int. Cl.
| | |
|---|---|
| *C12Q 1/00* | (2006.01) |
| *C12Q 1/32* | (2006.01) |
| *G01N 27/327* | (2006.01) |

(52) U.S. Cl.
CPC .............. *C12Q 1/005* (2013.01); *C12Q 1/32* (2013.01); *G01N 27/3272* (2013.01)

(58) Field of Classification Search
CPC . C12Q 1/003; C12Q 1/34; C12Q 1/54; C12Q 1/005; C12Q 1/006; C12Q 1/032;
(Continued)

(56) References Cited

U.S. PATENT DOCUMENTS

| | | |
|---|---|---|
| 5,658,444 A | 8/1997 | Black et al. |
| 7,402,153 B2 * | 7/2008 | Steil .................. A61B 5/14532 604/131 |

(Continued)

FOREIGN PATENT DOCUMENTS

| | | |
|---|---|---|
| EP | 3 156 788 A1 | 4/2017 |
| JP | 2013-190212 A | 9/2013 |

(Continued)

OTHER PUBLICATIONS

Office action issued on May 30, 2023 from Japan Intellectual Property Office in a counterpart Japanese Patent Application No. 2022-521696 (all the cited references are listed in this IDS.) (English translation is also submitted herewith.).

(Continued)

*Primary Examiner* — Gurpreet Kaur
(74) *Attorney, Agent, or Firm* — The PL Law Group, PLLC

(57) ABSTRACT

A biosensor according to an embodiment of the present invention includes a substrate, a working electrode disposed on the substrate, and a reference electrode disposed on the substrate to be spaced apart from the working electrode. The working electrode includes a sensing electrode disposed on a top surface of the substrate, an enzyme reaction layer disposed on a top surface of the sensing electrode, and a permeation control layer disposed on a top surface of the enzyme reaction layer, and the permeation control layer includes a water-soluble polymer and a water-insoluble polymer. The permeation layer includes a mixture of the water-soluble polymer and the water-insoluble polymer to improve a sensing performance for a sensing target material.

10 Claims, 2 Drawing Sheets

(58) Field of Classification Search
CPC ... G01N 27/3272; G01N 27/327; G01N 27/40
See application file for complete search history.

(56) References Cited

U.S. PATENT DOCUMENTS

2008/0027287 A1    1/2008   Shah et al.
2011/0152654 A1    6/2011   Wang et al.
2019/0357827 A1*  11/2019   Li ..................... A61B 5/14503

FOREIGN PATENT DOCUMENTS

| JP | 2015-52507 A | 3/2015 |
| JP | 2019-506910 A | 3/2019 |
| KR | 10-0800436 B1 | 2/2008 |
| KR | 10-0998648 B1 | 12/2010 |
| KR | 10-1624769 B1 | 5/2016 |
| KR | 10-2020-0097627 A | 8/2020 |
| WO | WO 01/36954 A1 | 5/2001 |
| WO | WO 2008/013849 A2 | 1/2008 |
| WO | WO 2019/017148 A1 | 1/2019 |

OTHER PUBLICATIONS

International Search Report for PCT/KR2020/016362 mailed on Feb. 24, 2021.
Notice of Allowance issued on Mar. 5, 2024 from Japan Intellectual Property Office in a counterpart Japanese Patent Application No. 2022-521696 (all the cited references are listed in this IDS.) (English translation is also submitted herewith.).
Office action issued on May 29, 2025 from China Patent Office in a counterpart China Patent Application No. 202080071043.2 (all the cited references are listed in this IDS.) (English translation is also submitted herewith.).

* cited by examiner

BIOSENSOR

CROSS REFERENCE TO RELATED APPLICATIONS AND CLAIM OF PRIORITY

The present application is a continuation application to International Application No. PCT/KR2020/016362 with an International Filing Date of Nov. 19, 2020 which claims Korean Patent Application No. 10-2019-0127899 filed on Oct. 15, 2019 at the Korean Intellectual Property Office, the disclosures of which are incorporated by reference herein in their entirety.

BACKGROUND

1. Technical Field

The present invention relates to a biosensor. More particularly, the present invention relates to a biosensor including a working electrode and a reference electrode.

2. Background Art

As a human life expectancy of human increases, a health care industry is expanding rapidly. Particularly, demands for a portable and small-sized biosensor that can conveniently measure various bio-signals anywhere are increasing.

For example, the biosensor may use an enzyme that react with chemical species contained in body fluids (sweat, tear, blood, etc.). When the enzyme reacts with the chemical species to generate an electric current, the current may be measured to determine a concentration of the corresponding chemical species.

However, in the enzyme-based biosensor, a measurable concentration range of the chemical species may be changed depending on the type of enzymes. For example, when an enzyme with a low affinity for a substrate is used, the reaction is saturated only when the concentration of the substrate is relatively high to detect a high concentration of the substrate. When an enzyme with a high affinity for a substrate is used, the reaction is saturated even at a low concentration of the substrate to result in a small measurable concentration range. Thus, detection of high concentration substrate is limited.

For example, Korean Registered Patent Publication No. 10-1624769 discloses a lactic acid sensor providing a rapid and accurate detection. However, an enzyme such as lactate oxidase having a high affinity for a substrate is used, a measurable concentration range of the substrate is limited, and a biosensor structure that can overcome the problem is not suggested.

SUMMARY

According to an aspect of the present invention, there is provided a biosensor having an improved sensing capability.

(1) A biosensor, including: a substrate; a working electrode disposed on the substrate, the working electrode including a sensing electrode disposed on a top surface of the substrate; an enzyme reaction layer disposed on a top surface of the sensing electrode; and a permeation control layer disposed on a top surface of the enzyme reaction layer, the permeation control layer including a water-soluble polymer and a water-insoluble polymer; and a reference electrode disposed on the substrate to be spaced apart from the working electrode.

(2) The biosensor of the above (1), wherein the water-soluble polymer includes at least one selected from the group consisting of polyvinyl alcohol (PVA), hydroxyethyl cellulose (HEC), hydroxypropyl cellulose (HPC), carboxymethyl cellulose (CMC), cellulose acetate and polyvinyl pyrrolidone (PVP).

(3) The biosensor of the above (1), wherein the water-insoluble polymer includes at least one selected from the group consisting of polyurethane (PU), polycarbonate (PC) and polyvinyl chloride (PVC).

(4) The biosensor of the above (1), wherein the permeation control layer is formed from a composition including a solvent, the water-soluble polymer and the water-insoluble polymer.

(5) The biosensor of the above (4), wherein the water-soluble polymer is included in an amount from 1 wt % to 10 wt % based on a total weight of the composition.

(6) The biosensor of the above (4), wherein the water-insoluble polymer is included in an amount from 0.5 wt % to 5 wt % based on a total weight of the composition.

(7) The biosensor of the above (1), wherein the permeation control layer has a multi-layered structure.

(8) The biosensor of the above (1), wherein the enzyme reaction layer includes an oxidase or a dehydrogenase.

(9) The biosensor of the above (8), wherein the oxidase includes at least one selected from the group consisting of glucose oxidase, cholesterol oxidase, lactate oxidase, ascorbic acid oxidase and alcohol oxidase, and the dehydrogenase includes at least one selected from the group consisting of glucose dehydrogenase, glutamic acid dehydrogenase, lactate dehydrogenase and alcohol dehydrogenase

(10) The biosensor of the above (1), wherein the enzyme reaction layer includes an enzyme having a Km (Michaelis constant) value from 0.1 mM to 10 mM.

(11) The biosensor of the above (1), wherein the sensing electrode includes a carbon electrode layer.

(12) The biosensor of the above (11), wherein the sensing electrode further includes a metal electrode layer disposed between the substrate and the carbon electrode layer.

(13) The biosensor of the above (1), further including a protective layer disposed on a top surface of the permeation control layer.

(14) The biosensor of the above (1), wherein the biosensor is used to measure a lactic acid concentration.

In a biosensor according to exemplary embodiments of the present invention, a permeation control layer including a water-soluble polymer and a water-insoluble polymer is disposed on a top surface of an enzyme reaction layer. Accordingly, a high-concentration sample may be detected and a measurement concentration range (responsive range) for a sensing target material may be adjusted.

In exemplary embodiments, the permeation control layer may be formed by mixing the water-soluble polymer and the water-insoluble polymer. Thus, an enzyme in the enzyme reaction layer may be stabilized and a stability of the permeation control layer may be improved.

In some embodiments, a working electrode and the biosensor may be thinned by forming the sensing electrode as a single carbon paste layer.

BRIEF DESCRIPTIONS OF THE DRAWINGS

DETAILED DESCRIPTION OF THE EMBODIMENTS

According to embodiments of the present invention, a biosensor including a substrate, a working electrode disposed on the substrate, and a reference electrode disposed on the substrate to be spaced apart from the working electrode is provided.

The working electrode includes a sensing electrode disposed on a top surface of the substrate, an enzyme reaction layer disposed on a top surface of the sensing electrode, and a permeation control layer disposed on a top surface of the enzyme reaction layer. The permeation control layer includes a water-soluble polymer and a water-insoluble polymer. The permeation control layer may be formed by mixing a water-soluble polymer and the water-insoluble polymer to improve, e.g., a sensing performance for a sensing target material.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
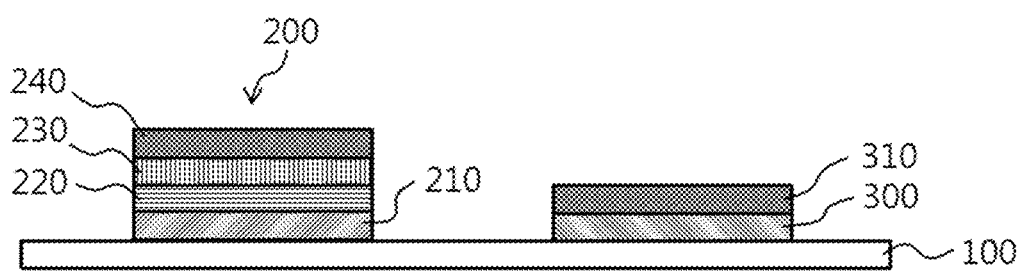
FIG. 1 is a schematic side view illustrating a biosensor according to exemplary embodiments of the present invention.

FIG. 1 is a schematic side view illustrating a biosensor according to exemplary embodiments of the present invention.

Referring to FIG. 1, a biosensor according to exemplary embodiments may include a substrate 100, a working electrode 200 and a reference electrode 300. The working electrode 200 may include a sensing electrode 210, an enzyme reaction layer 220 and a permeation control layer 230. In some embodiments, the working electrode 200 may further include a first protective layer 240, and the reference electrode 300 may further include a second protective layer 310.

The substrate 100 may serve as, e.g., a base layer on which the working electrode 200 and the reference electrode 300 are disposed.

The substrate 100 may be a flexible film. For example, the flexible film may include a thermoplastic resin, e.g., a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth) acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyether-sulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin. A thermosetting or UV-curable resin such as a (meth)acrylic resin, a urethane-based resin, an acrylic urethane-based resin, an epoxy-based resin, a silicone-based resin, etc.

A thickness of the substrate 100 may be properly determined in a desirable range, e.g., from 1 μm to 500 μm in consideration of strength, easiness of maintenance, process, formation of a thin-layered structure, etc. Preferably, the thickness of the substrate 100 may be in a range from 1 μm to 300 μm, more preferably, from 5 μm to 200 μm.

In some embodiments, the substrate 100 may include an additive. For example, an ultraviolet absorber, an antioxidant, a lubricant, a plasticizer, a releasing agent, a color-inhibitor, a flame retardant, a nucleating agent, an antistatic agent, a pigment, colorants, etc. may be included as additives.

In some embodiments, the substrate 100 may include a functional layer on one or both sides of the film. The functional layer may include, e.g., a hard coating layer, an antireflection layer, a gas barrier layer, etc.

In some embodiments, the substrate 100 may be surface-treated. For example, the surface treatment may include a dry treatment such as a plasma treatment, a corona treatment, a primer treatment, etc., a chemical treatment such as an alkali treatment including a saponification treatment.

An oxidation-reduction reaction of the sensing target material may occur in the working electrode. The working electrode 200 may detect, e.g., an electrical signal generated by a reaction between an enzyme of the enzyme reaction layer 220 and the sensing target material. Non-limiting examples of the sensing target material may include human sweat, body fluid, blood, etc. For example, the sensing target material may include glucose or lactic acid (lactate).

In exemplary embodiments, the working electrode 200 may include the sensing electrode 210, the enzyme reaction layer 220 and the permeation control layer 230, and may further include the first protective layer 240.

The sensing electrode 210 may be disposed on the substrate 100. For example, the sensing electrode 210 may contact the substrate 100. The sensing electrode 210 may serve as a path through which, e.g., electrons or holes generated in an oxidation-reduction reaction of the sensing target material are transferred.

In exemplary embodiments, the sensing electrode 210 may be formed by printing a carbon paste on the substrate 100, or patterning a metal layer including at least one of Au, Ag, Cu, Pt, Ti, Ni, Sn, Mo, Co, Pd and an alloy thereof.

The patterning may include a method commonly used in the related art. For example, a photolithography method may be used.

The sensing electrode 210 may further include a metal protective layer. In this case, the metal layer may be patterned and then the metal protective layer is formed, or an indium tin oxide (ITO) or indium zinc oxide (IZO) conductive oxide layer may be formed on the metal layer and then the metal layer and the conductive oxide layer may be patterned together.

In exemplary embodiments, the sensing electrode 210 may be formed of a single layer of the carbon paste. In this case, the carbon paste layer may serve as an electrode, and a formation of an additional metal electrode may be omitted. Therefore, the biosensor may be formed as a thin-layered structure.

In exemplary embodiments, the enzyme reaction layer 220 may be disposed on the sensing electrode 210. For example, the enzyme reaction layer 220 may be in a direct contact with a top surface of the sensing electrode 210. The enzyme reaction layer 220 may serve as, e.g., a layer in which a chemical reaction of the sensing target material.

In exemplary embodiments, the enzyme reaction layer 220 may include an oxidase or a dehydrogenase. The oxidase and the dehydrogenase may be selected according to a type of the sensing target material.

In exemplary embodiments, the oxidase may include at least one of glucose oxidase, cholesterol oxidase, lactate oxidase, ascorbic acid oxidase or alcohol oxidase.

In exemplary embodiments, the dehydrogenase may include at least one of glucose dehydrogenase, glutamate dehydrogenase, lactate dehydrogenase or alcohol dehydrogenase.

Accordingly, the biosensor including the enzyme reaction layer 220 may be capable of measuring a concentration of lactate, glucose, cholesterol, ascorbic acid, alcohol and/or glutamic acid.

For example, when the biosensor is a lactate sensor, the enzyme reaction layer 220 may include lactate oxidase or lactate dehydronase.

In some embodiments, the oxidase or the dehydrogenase may be immobilized using a binder. The binder may include those commonly used in the related art, and may include, e.g., at least one of Nafion and a derivative thereof, or chitosan.

The enzyme reaction layer 220 may be formed by coating a composition obtained by mixing the oxidase and the dehydrogenase with the binder, and then drying.

A coating method commonly used in the related art may be used. For example, a conventional printing method such as drop casting may be used.

In some embodiments, the enzyme reaction layer 220 may include an enzyme having a Km (Michaelis constant) value from 0.1 to 10 mM. Accordingly, a concentration range of a measurable sample determined by the Km value of the enzyme may be more effectively controlled.

In exemplary embodiments, the permeation control layer 230 may be disposed on the enzyme reaction layer 220. For example, the permeation control layer 230 may be in direct contact with a top surface of the enzyme reaction layer 220. The permeation control layer 230 may include a water-soluble polymer and a water-insoluble polymer.

For example, a composition for forming a permeation control layer including the water-soluble polymer and the water-insoluble polymer may be coated on the enzyme reaction layer 220 and then dried to form the permeation control layer 230. Thus, the enzyme reaction layer 220 may be protected from an external physical impact by the permeation control layer 230, and the oxidase or dehydrogenase of the enzyme reaction layer 220 may be prevented from being exposed to an external environment.

A coating method commonly used in the related art may be used. For example, a conventional printing method such as a drop casting may be used. In this case, casting of the composition for forming the permeation control layer may be implemented to form a film having an appropriate strength.

The enzyme reaction layer 220 may include, e.g., enzymes having various Km (Michaelis-Menten constant) values.

As used herein, the term "Km" represents an affinity of an enzyme for a substrate. For example, a low Km indicates that a substrate-enzyme affinity is high, and an enzyme-substrate complex state may be stable. For example, a high Km indicates that the substrate-enzyme affinity is low, and generation of products may be promoted.

The following Equation 1 is Michaelis-Menten equation representing an initial reaction rate of the enzyme according to a concentration of the substrate.

$$v = V\text{Max}\frac{[S]}{K_M + [S]} \quad \text{[Equation 1]}$$

(In Equation 1, [S] is a concentration of the substrate, $K_M$ is a Michaelis-Menten constant (Km), v is a reaction rate, and Vmax is a maximum reaction rate in the Michaelis-Menten equation)

According to Equation 1, when an enzyme having a relatively low Km value is used, a measurable concentration of the substrate may be reduced. For example, when lactate oxidase having a low Km value is used, a substrate with a high concentration of 10 mM or more may not be easily detected.

The permeation control layer 230 may adjust a responsive range of the biosensor by, e.g., adjusting a diffusion rate of the substrate. For example, the permeation control layer 230 may increase a maximum responsive concentration of the biosensor by slowing a rate at which a sample containing a high concentration of the substrate flows into the enzyme reaction layer 220.

In exemplary embodiments, the water-soluble polymer may include at least one of polyvinyl alcohol (PVA), hydroxyethyl cellulose (HEC), hydroxypropyl cellulose (HPC), carboxy methyl cellulose (CMC), cellulose acetate and polyvinyl pyrrolidone (PVP).

Accordingly, the permeation control layer 230 may stabilize the oxidase or dehydrogenase of the enzyme reaction layer 220. Additionally, a polymer film may be formed on the permeation control layer 230 to control the rate at which the substrate of the sample including the sensing target material diffuses into the sensing electrode 210.

In example embodiments, the water-insoluble polymer may include at least one of polyurethane (PU), polycarbonate (PC) and polyvinyl chloride (PVC).

Accordingly, the water-insoluble polymer may be mixed with the water-soluble polymer to further improve stability of the permeation control layer 230.

The permeation control layer 230 may be formed by, e.g., applying a composition for forming the permeation control layer and then drying the composition. For example, the permeation control layer 230 may be formed by a simple process using a drop casting process.

For example, the composition for forming the permeation control layer may include the water-soluble polymer and the water-insoluble polymer. The composition for forming the permeation control layer may further include a solvent.

When an enzyme having a relatively low Km value is used, a sensing performance for a high-concentration substrate may be deteriorated according to the Michaelis-Menten equation. For example, lactate oxidase has a relatively low Km value of about 1 mM, and detecting the high-concentration substrate of 10 mM or more may be limited.

In exemplary embodiments, the enzyme reaction layer 220 may include an enzyme having a Km value in a range from about 0.1 to 10 mM. In some embodiments, the enzyme reaction layer 220 may include an enzyme having a Km value in a range from about 0.1 to 5 mM. In an embodiment, the enzyme reaction layer 220 may include an enzyme having a Km value in a range from about 0.5 to 3 mM.

In exemplary embodiments, even though the Km value of the enzyme reaction layer 220 is decreased, the introduction rate of the substrate through the permeation control layer 230 may be delayed or lagged, so that the substrate-enzyme may be prevented from being adsorbed or stabilized. Thus, even though an enzyme having a small Km value is employed, the biosensor having a wide responsive range may be achieved.

The solvent may include water or an organic solvent, and the organic solvent may include an alcohol such as ethanol. The solvent may be a buffer further containing a salt. Accordingly, the water-soluble polymer and the water-insoluble polymer may be effectively dispersed.

For example, the water-soluble polymer may be included in an amount of 1 to 10 wt % based on a total weight of the composition for forming the permeation control layer.

If the amount of the water-soluble polymer is less than 1 wt %, the polymer film may not be formed. If the amount of the water-soluble polymer exceeds 10 wt %, a diffusion rate of the substrate may be excessively reduced to result in a degradation of sensitivity and resolution of the biosensor.

For example, the water-insoluble polymer may be included in an amount from 0.5 to 5 wt % based on the total weight of the composition for forming the permeation control layer. If the amount of the water-insoluble polymer is less than 0.5 wt %, the stabilizing effect of the permeation control layer 230 may be reduced. If the amount of the water-insoluble polymer exceeds 5 wt %, an amount of the organic solvent required to dissolve the water-insoluble polymer increases and damages to the working electrode 200 may be caused.

The first protective layer 240 may be disposed on the permeation control layer 230. For example, the first protective layer 240 may in a direct contact with a top surface of the permeation control layer 230. In some embodiments, the first passivation layer 240 may be omitted.

For example, the first protective layer 240 may protect the working electrode 200 from an external impact and chemical substances other than the sensing target material. For example, only the sensing target material may pass through the first protective layer 240. Accordingly, the enzyme reaction layer 220 may be prevented from being denatured or damaged by a material other than a component to be measured.

Any material capable of passing the sensing target material may be used without particular limitation for the first protective layer 240. For example, an ion exchange membrane commonly used in the related art may be used, and may include Nafion or a derivative thereof.

In example embodiments, the reference electrode 300 may be disposed on the substrate 100. For example, the reference electrode 300 may be disposed on the same surface of the substrate 100 on which the working electrode 200 is disposed. For example, the reference electrode 300 may be spaced apart from the working electrode 200. For example, the reference electrode 300 and the working electrode 200 may be electrically disconnected.

For example, the reference electrode 300 may provide a reference value for a current value or a potential value measured by the working electrode 200 during a measurement. For example, the oxidation-reduction reaction of the sensing target material occurring in the working electrode 200 may be specified by using the potential value from the reference electrode 300 as a reference value.

Further, the reference value of the current value may be compared with the current value measured by the working electrode 200 to calculate a current amount originally changed by a measurement target component (e.g., the sensing target material), and a concentration of the measurement target component may be derived from the current amount.

The reference electrode 300 may include, e.g., an Ag/AgCl electrode layer. The Ag/AgCl electrode layer may be formed from, e.g., Ag/AgCl paste.

In an embodiment, the second protective layer 310 may be disposed on a top surface of the reference electrode 300. The second protective layer 310 may protect the reference electrode 300 from external impact and environment. For example, the second protective layer 310 may be formed of substantially the same material and method as those for the first protective layer 240 formed on the enzyme reaction layer 220 of the working electrode 200.

In some embodiments, a wiring may be connected to each of the working electrode 200 and the reference electrode 300. The wiring connected to the working electrode 200 and the wiring connected to the reference electrode 300 may be electrically spaced apart from each other. The wirings may each be connected to a driving integrated circuit (IC) chip.

For example, the wiring may be formed of substantially the same material as that of the sensing electrode 210 of the working electrode 200, and may be formed of substantially the same material as that of the reference electrode 300.

In some embodiments, the wiring may each be integrally formed with the working electrode 200 and the reference electrode 300. For example, a carbon paste layer and/or a metal layer may be formed on the substrate 100, and patterned to form the integral wiring. Alternatively, the sensing electrode 210, the reference electrode 300 and the wiring may be integrally formed by a screen printing method.

For example, electrical signals measured from the working electrode 200 and the reference electrode 300 may be transmitted to the driving IC chip through the wiring, and the driving IC chip may calculate the concentration of the measurement target component.

Figure 2:
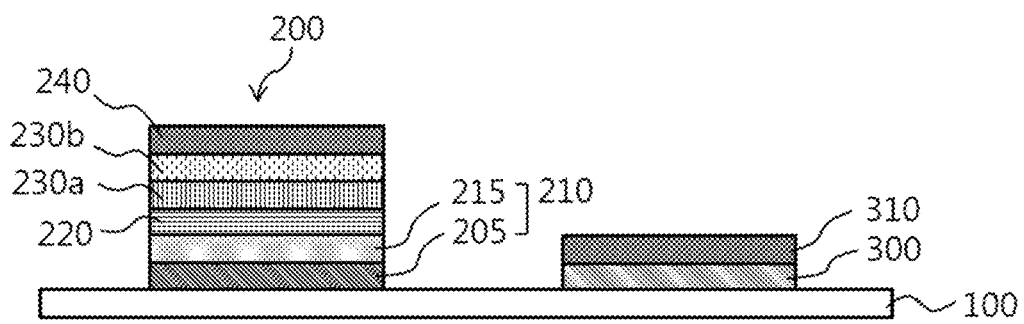
FIG. 2 is a schematic side view showing a biosensor according to some exemplary embodiments of the present invention.

FIG. 2 is a schematic side view showing a biosensor according to some exemplary embodiments of the present invention.

Referring to FIG. 2, the sensing electrode 210 may include a metal electrode layer 205 and a carbon electrode layer 215.

In some embodiments, the metal electrode layer 205 may be disposed on a bottom surface of the carbon electrode layer 215. For example, the metal electrode layer 205 may contact the substrate 100. For example, the carbon electrode layer 215 may contact the enzyme reaction layer 220.

In some embodiments, the metal electrode layer 205 may further include a metal layer and a metal protective layer disposed on a top surface of the metal layer. In an embodiment, the metal layer and the metal protective layer may be interposed between the substrate 100 and the carbon electrode layer 215.

The metal protective layer may entirely cover the top surface of the metal layer and may have an electrical conductivity. For example, the metal protective layer may be in a direct contact with the metal layer. For example, the metal protective layer may prevent an oxidation-reduction of the metal layer due to an oxidation-reduction reaction of the working electrode 200.

In exemplary embodiments, the metal layer may include at least one of Au, Ag, Cu, Pt, Ti, Ni, Sn, Mo, Co, Pd and an alloy thereof. For example, an APC alloy (Ag—Pd—Cu alloy) may be used.

In some embodiments, the metal layer may be formed of at least one selected only from Au, Ag, the Ag—Pd—Cu alloy (APC) and Pt.

For example, Au, Ag, the APC alloy (Ag—Pd—Cu alloy) and Pt may improve electrical conductivity and reduce resistance of the sensing electrode 210. Accordingly, a detection performance of the biosensor 10 may be improved.

In exemplary embodiments, the metal protective layer may include indium tin oxide (ITO) or indium zinc oxide (IZO). For example, the metal protective layer may be formed of only indium tin oxide (ITO) or indium zinc oxide (IZO). For example, ITO and IZO may have improved electrical conductivity and may be chemically stable to effectively protect the metal layer from the oxidation-reduction reaction.

For example, the metal protective layer may prevent the metal layer from being in direct contact with an atmosphere to prevent an oxidation of a metal component included in the metal layer. Accordingly, reliability of an electrical signal sensed by the metal layer may be improved.

In some embodiments, the carbon electrode layer 215 may be disposed on a top surface of the metal electrode layer 205. For example, the carbon electrode layer 215 may contact the top surface of the metal electrode layer 205. For example, the carbon electrode layer 215 may include a carbon-based material, and may further include an electron transport material and a polymer electrolyte. For example, the carbon electrode layer 215 may include a carbon paste. Accordingly, transporting electrons and/or holes generated in the enzyme reaction layer 220 may be transferred to the sensing electrode 210 so that the sensing performance of the enzyme reaction layer 220 for the sensing target material may be improved.

In some embodiments, the electron transport material may include a material that is oxidized or reduced by receiving electrons/holes generated by the oxidation-reduction reaction of the sensing target material in the enzyme reaction layer 220. Accordingly, the electrons/holes may be transferred to the sensing electrode 210 via the oxidation or reduction.

For example, the electron transport material may include a cyanide complex of iron (Fe). The cyanide complex of iron may be easily oxidized or reduced.

The sensing target material may react with the enzyme in the enzyme reaction layer 220 to form hydrogen peroxide ($H_2O_2$). For example, an electric current generated by a decomposition of hydrogen peroxide may be measured by the biosensor. When the cyanide complex of iron is used, a redox potential of hydrogen peroxide may be lowered. Therefore, hydrogen peroxide may be selectively decomposed at a lower potential to improve a selectivity of the biosensor.

For example, when the cyanide complex of iron is not used, hydrogen peroxide is decomposed at a high potential, materials other than hydrogen peroxide may be decomposed together to generate an electric current.

In some embodiments, the electron transport material may include at least one of Prussian blue ($Fe_4[Fe(CN)_6]_3$), potassium ferricyanide ($K_3[Fe(CN)_6]$) or potassium iron ferrocyanide ($KFeIII[FeII(CN)_6]·H_2O$). For example, Prussian blue is a blue pigment and may have high oxidation properties. For example, when Prussian blue is used as the electron transport material, an electrical sensitivity of the working electrode 200 may be improved.

For example, the polymer electrolyte may include Nafion or a derivative thereof. The polymer electrolyte may disperse and immobilize the electron transport material.

Accordingly, a contact area between the electron transport material and the enzyme reaction layer 220 may be increased, so that an upper limit of a detectable concentration of the enzyme reaction layer 220 may be increased. Further, the polymer electrolyte may uniformly disperse the electron transport material to prevent agglomeration. Thus, sensing speed, sensitivity and sensing range of the biosensor may be improved.

Referring to FIG. 2, in some embodiments, the permeation control layer 230 may include a multi-layered structure. For example, in the multi-layered structure, a plurality of permeation control layers 230 may be stacked in contact with each other. Accordingly, a diffusion rate at which a substrate of a sample flows into the enzyme reaction layer 220 may be finely controlled.

For example, the permeation control layer 230 may have a multi-layered structure from a double-layered structure to a penta-layered structure. The number of layers in the permeation control layer 230 exceeds 5, a drying time may be increased when manufacturing the biosensor through the drying process, and the diffusion rate of the substrate may be delayed, thereby reducing sensitivity and resolution of the sensor.

The biosensor according to example embodiments may be used to measure lactate (lactic acid). For example, as intensity and duration of exercise increases, a level of lactic acid in the body may also increase. Lactic acid may be excreted to an outside of the body through sweat, and a concentration of discharged lactic acid may be measured using the biosensor.

For example, the concentration of lactic acid may be increased to several tens of mM during exercise. The biosensor according to the exemplary embodiments may include the permeation control layer 230 to provide accurate and quick measurement using lactate oxidase having a relatively low Km value even though the concentration of lactic acid is high.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1: Preparation of Lactate Sensor

A 180 μm-thick PET substrate was prepared as an insulating substrate.

A sensing electrode was formed by screen-printing a paste (DS-7406CF, manufactured by Daejoo Electronic Materials) containing 3 parts by weight of Prussian blue based on 100 parts by weight of a carbon paste on the substrate.

A reference electrode was formed by screen-printing Ag/AgCl to be spaced apart from the sensing electrode at a predetermined distance.

A lactate oxidase reagent layer was formed on the sensing electrode. The lactate oxidase reagent layer was prepared as follows.

40 μl of PBS buffer and 20 μl of 1-methoxy-5-methylphenazinium methyl sulfate (Sigma Aldrich, 50 mM stock solution) were added and uniformly mixed in 40 μl of lactate oxidase (manufactured by TOYOBO, 10 U/1 μl stock solution) to prepare a composition for forming an enzyme reaction layer. 2.0 μl of the composition for forming the enzyme reaction layer was dropped on the sensing electrode, and dried at room temperature for about 30 minutes to form an enzyme reaction layer.

A permeation control layer having a thickness of 9.2 μm was formed on the enzyme reaction layer. The permeation control layer was formed by coating and drying a composition for forming a permeation control layer including 10 wt % of polyvinyl pyrrolidone (PVP), 2 wt % of polyurethane (PU) and water.

Example 2

A sensor was manufactured by the same method as that in Example 1, except that the permeation control layer was formed as a triple-layered structure in which three layers were in contact with each other.

Example 3

A sensor was manufactured by the same method as that in Example 1, except that the permeation control layer was formed as a penta-layered structure in which five layers were in contact with each other.

Comparative Example

A 180 μm-thick PET substrate was prepared as an insulating substrate.

A sensing electrode was formed by screen-printing a paste (DS-7406CF, manufactured by Daejoo Electronic Materials) containing 3 parts by weight of Prussian blue based on 100 parts by weight of a carbon paste on the substrate.

A reference electrode was formed by screen-printing Ag/AgCl to be spaced apart from the sensing electrode at a predetermined distance.

A lactate oxidase reagent layer was formed on the sensing electrode. The lactate oxidase reagent layer was prepared as follows.

40 μl of PBS buffer and 20 μl of 1-methoxy-5-methylphenazinium methyl sulfate (Sigma Aldrich, 50 mM stock solution) were added and uniformly mixed in 40 μl of lactate oxidase (manufactured by TOYOBO, 10 U/1 μl stock solution) to prepare a composition for forming an enzyme reaction layer. 2.0 μl of the composition for forming the enzyme reaction layer was dropped on the sensing electrode, and dried at room temperature for about 30 minutes to form an enzyme reaction layer.

Experimental Example

Measurement of Maximum Lactate-Sensitized Concentration

Currents of a lactic acid standard solutions were measured using the biosensor of Examples and Comparative Examples. Here, the lactic acid standard solutions were sodium L-Lactate (Sigma-aldrich), and each lactic acid standard solution (1, 3, 5, 10, 15, 20, 25, 30, 35 40 and 50 mmol/L) were evenly dropped on the working electrode and the reference electrode, a voltage of 0.2 V was applied, and a current value after 20 seconds was measured to evaluate a maximum concentration of lactic acid in the sample capable of being responded by the biosensor and to obtain the graph of FIG. 3.

Figure 3:
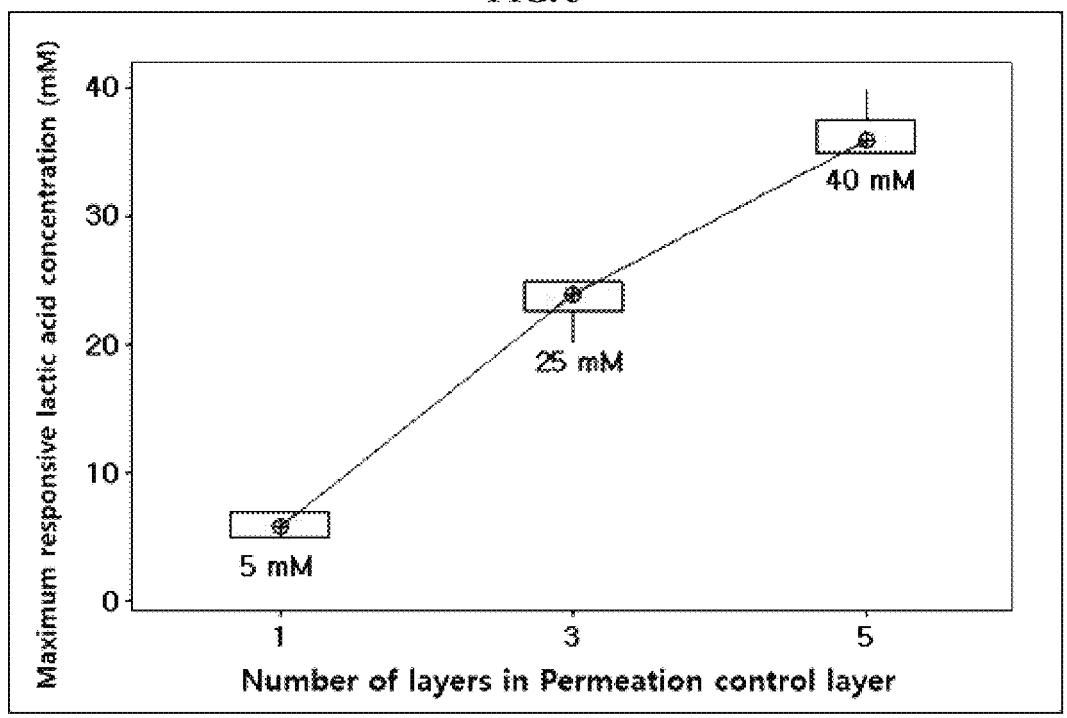
FIG. 3 is a graph of measuring a maximum responsive lactic acid concentration using a biosensor according to exemplary embodiments of the present invention.

Referring to FIG. 3, the biosensor of Example 1 could detect the sample containing up to 5 mM lactic acid, and the biosensor of Examples 2 and 3 could detect the sample containing up to 25 mM and 40 mM lactic acid, respectively. In the biosensor of Comparative Example, when the lactate concentration exceeded 5 mM, the current value decreased despite the increase in the lactic acid concentration. That is, when the concentration of lactic acid exceeded 5 mM, the detection of the lactic acid concentration was failed.

The biosensor of Example 1 included only a single layer of the permeation control layer, but provided a wider sensitivity range than that of Comparative Example. In the biosensors of Examples 2 and 3, the permeation control layer had multi-layered structures, and the sensing performance (sensitivity range) for lactic acid was remarkably improved compared to that from Comparative Example.

What is claimed is:
1. A biosensor, comprising:
a substrate;
a working electrode disposed on the substrate, the working electrode comprising:
a sensing electrode disposed on a top surface of the substrate;
an enzyme reaction layer disposed on a top surface of the sensing electrode; and
a permeation control layer disposed on a top surface of the enzyme reaction layer, the permeation control layer comprising a water-soluble polymer and a water-insoluble polymer; and
a reference electrode disposed on the substrate to be spaced apart from the working electrode, so that the permeation control layer is spaced apart from the reference electrode,
wherein the permeation control layer has a multi-layered structure from a double-layered structure to a penta-layered structure,
wherein the permeation control layer is formed from a composition comprising a solvent including water, and a mixture of the water-soluble polymer and the water-insoluble polymer,
the water-soluble polymer is included in an amount from 1 wt % to 10 wt % based on a total weight of the composition, and
the water-insoluble polymer is included in an amount from 0.5 wt % to 5 wt % based on a total weight of the composition.
2. The biosensor of claim 1, wherein the water-soluble polymer comprises at least one selected from the group consisting of polyvinyl alcohol (PVA), hydroxyethyl cellulose (HEC), hydroxypropyl cellulose (HPC), carboxymethyl cellulose (CMC), cellulose acetate and polyvinyl pyrrolidone (PVP).
3. The biosensor of claim 1, wherein the water-insoluble polymer comprises at least one selected from the group consisting of polyurethane (PU), polycarbonate (PC) and polyvinyl chloride (PVC).
4. The biosensor of claim 1, wherein the enzyme reaction layer comprises an oxidase or a dehydrogenase.
5. The biosensor of claim 4, wherein the oxidase comprises at least one selected from the group consisting of glucose oxidase, cholesterol oxidase, lactate oxidase, ascorbic acid oxidase and alcohol oxidase, and
the dehydrogenase comprises at least one selected from the group consisting of glucose dehydrogenase, glutamic acid dehydrogenase, lactate dehydrogenase and alcohol dehydrogenase.
6. The biosensor of claim 1, wherein the enzyme reaction layer includes an enzyme having a Km (Michaelis constant) value from 0.1 mM to 10 mM.

7. The biosensor of claim 1, wherein the sensing electrode comprises a carbon electrode layer.

8. The biosensor of claim 7, wherein the sensing electrode further comprises a metal electrode layer disposed between the substrate and the carbon electrode layer.

9. The biosensor of claim 1, further comprising a protective layer disposed on a top surface of the permeation control layer.

10. The biosensor of claim 1, wherein the biosensor is used to measure a lactic acid concentration.

* * * * *